United States Patent
Vaidya et al.

(10) Patent No.: US 9,511,356 B2
(45) Date of Patent: Dec. 6, 2016

(54) REGENERATION OF SPENT PARAFFIN DEHYDROGENATION CATALYST

(71) Applicant: Reliance Industries Limited, Mumbai (IN)

(72) Inventors: Shashank Dattatraya Vaidya, Thane (IN); Sharad Vasudeorao Lande, Akola (IN); Sreedharan Unnikrishnan, Vadodara (IN); Kalpana Gopalakrishnan, Vadodara (IN); Raksh Vir Jasra, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 14/577,495

(22) Filed: Dec. 19, 2014

(65) Prior Publication Data

US 2015/0111720 A1 Apr. 23, 2015

Related U.S. Application Data

(63) Continuation of application No. PCT/IN2013/000386, filed on Jun. 21, 2013.

(30) Foreign Application Priority Data

Jun. 21, 2012 (IN) ........................ 1781/MUM/2012

(51) Int. Cl.

| | | |
|---|---|---|
| B01J 23/96 | (2006.01) | |
| B01J 38/02 | (2006.01) | |
| B01J 38/10 | (2006.01) | |
| B01J 38/12 | (2006.01) | |
| B01J 38/18 | (2006.01) | |
| B01J 38/20 | (2006.01) | |
| B01J 38/44 | (2006.01) | |
| B01J 21/04 | (2006.01) | |
| B01J 23/62 | (2006.01) | |
| B01J 35/00 | (2006.01) | |
| B01J 35/02 | (2006.01) | |
| B01J 35/10 | (2006.01) | |
| B01J 21/12 | (2006.01) | |
| B01J 21/20 | (2006.01) | |

(52) U.S. Cl.
CPC ............... *B01J 23/96* (2013.01); *B01J 21/04* (2013.01); *B01J 21/12* (2013.01); *B01J 21/20* (2013.01); *B01J 23/626* (2013.01); *B01J 35/002* (2013.01); *B01J 35/006* (2013.01); *B01J 35/023* (2013.01); *B01J 35/1014* (2013.01); *B01J 35/1038* (2013.01); *B01J 35/1042* (2013.01); *B01J 35/1047* (2013.01); *B01J 35/1061* (2013.01); *B01J 38/02* (2013.01); *B01J 38/10* (2013.01); *B01J 38/12* (2013.01); *B01J 38/18* (2013.01); *B01J 38/20* (2013.01); *B01J 38/44* (2013.01)

(58) Field of Classification Search
CPC ............. B01J 21/12; B01J 38/10; B01J 38/02; B01J 21/20; B01J 38/12; B01J 38/18; B01J 38/20; B01J 38/44; B01J 23/626; B01J 23/96; B01J 35/002; B01J 35/006; B01J 35/023; B01J 35/1014; B01J 35/1038; B01J 35/1042; B01J 35/01
USPC ................................................... 502/20–556
See application file for complete search history.

(56) References Cited

U.S. PATENT DOCUMENTS

| | | | |
|---|---|---|---|
| 4,133,743 A | 1/1979 | Boret et al. | |
| 4,192,771 A | 3/1980 | Burbidge et al. | |
| 4,492,767 A | 1/1985 | Fung | |
| 4,835,129 A | 5/1989 | Travers et al. | |
| 4,849,092 A * | 7/1989 | Ham ..................... | B01J 23/96 |
| | | | 208/139 |
| 5,179,054 A * | 1/1993 | Schipper ................ | B01J 33/00 |
| | | | 502/65 |
| 5,183,789 A | 2/1993 | Boyle | |
| 5,336,829 A | 8/1994 | Boitiaux et al. | |
| 5,854,162 A | 12/1998 | Dufresne et al. | |
| 6,348,144 B1 | 2/2002 | Gevelinger | |
| 6,700,028 B2 | 3/2004 | Dyroff | |
| 7,037,871 B1 | 5/2006 | Galperin et al. | |
| 2015/0111720 A1 * | 4/2015 | Vaidya ................... | B01J 38/02 |
| | | | 502/49 |

FOREIGN PATENT DOCUMENTS

GB 1293662 A 10/1972

OTHER PUBLICATIONS

Nanowerk, "Nanocatalysis: Applications in the chemical industry" Posted: Nov. 5, 2010 <http://www.nanowerk.com/spotlight/spotid=18846.php>.*

Pieck, Carlos L. et al. "Differences in coke burning-off from PT-Sn/Al2O3 catalyst with oxygen or ozone" Applied Catalysis A: General 278 (2005) 173-180 (8 pages).

D'Ippolito, Silvana A. et al. "O2 and O3 regeneration of PtReSn/Al2O3 and PtReGe/Al2O3 naphtha reforming catalysts prepared by catalytic reduction" Applied Catalysis A: General 388 (2010) 272-277 (6 pages).

\* cited by examiner

*Primary Examiner* — Jennifer A Smith
(74) *Attorney, Agent, or Firm* — Osha Liang LLP

(57) ABSTRACT

There is provided a method for regenerating a spent dehydrogenation catalyst used in the conversion of n-paraffin to olefin. The method comprises method steps for removing the coke by treating the catalyst with an ozone-oxygen stream followed by an oxygen stream. The catalyst is stabilized by passing a nitrogen stream and the stabilized catalyst is rejuvenated by passing an air-nitrogen stream containing a halogenated hydrocarbon. This is followed by reducing the metal oxide in the catalyst by passing hydrogen-nitrogen stream.

12 Claims, No Drawings

REGENERATION OF SPENT PARAFFIN DEHYDROGENATION CATALYST

The present invention relates to regeneration of spent deactivated catalyst used in hydrocarbon conversion processes. More particularly, the present invention relates to regeneration of polyatomic catalysts with a refractory support material. Still more particularly the present invention relates to regeneration of platinum containing polyatomic catalyst.

BACKGROUND AND PRIOR ART

Various platinum containing catalysts used in a wide variety of hydrocarbon conversion processes are known. Activity of these catalysts gradually declines due to the build-up of coke, until eventually they require regenerating and reactivating. The known methods for treatment of such spent catalyst invariably comprise removal of deposited coke. Typically, the coke is removed by controlled burning in the presence of diluted air at 450° C. to 550° C. High temperatures used for coke removal however lead to agglomeration of the metal particles during processing which in turn affects the textural properties of the catalyst support. This reduces the activity and stability of the catalyst.

Various attempts have been made to overcome the above mentioned shortcomings. A process for the regeneration of a coked catalyst comprising metals from Group IV, VII or VIII of the Periodic Table is disclosed in U.S. Pat. No. 5,183,789. It involves the treatment of the catalyst with a gaseous stream of ozone in air with specific velocity at temperature ranging from about 60° C. to about 120° C.

Another process for regenerating a dehydrogenation catalyst comprising Pt, Rh, Ir, Pd, Ru, and Os deposited on a solid support of porous alumina and an activator component selected from transition metals from periodic table of elements which is specifically used for dehydrogenating ($C_9$-$C_{15}$) hydrocarbon is disclosed in U.S. Pat. No. 6,700,028. The method step of regenerating the catalyst in accordance with the process disclosed in U.S. Pat. No. 6,700,028 involves heating the catalyst in an oxygen-bearing atmosphere to a temperature sufficient to cause at least a portion of any coke present on the surface of said catalyst to be oxidized. Thus, the scope of the treatment of the catalyst in accordance with the process disclosed in U.S. Pat. No. 6,700,028 is particularly limited to heating in the presence of oxygen bearing atmosphere ($O_2$+$N_2$).

There is also disclosed a process for reactivating a coked and agglomerated platinum-iridium-selenium on alumina reforming catalyst in U.S. Pat. No. 4,492,767. It comprises partial decoking in $O_2$-containing atmosphere at a temperature below about 430° C. followed by reduction of the catalyst using hydrogen gas. The catalyst is then further treated in oxygen free atmosphere with a halide providing compound. This is followed by the method step of re-dispersing the metallic Ir by treating the catalyst with hydrogen and water vapor.

U.S. Pat. No. 6,348,144 provides still another process which involves regeneration of a catalyst comprising Pt on a support like alumina. It comprises a method step of pre-combusting oxygen (air) and a halogen containing compound (e.g. trichloro methane) and withdrawing effluent stream of $O_2$ and halogen. The withdrawn effluent stream is contacted with the catalyst and a portion of the platinum present on the catalytic particles is dispersed.

A method for regenerating a deactivated hydrocarbon conversion catalyst such as dehydrogenation catalyst comprising a combination of a platinum group component, a rhenium component, and a halogen component with an alumina carrier material is disclosed in GB 1293632. It involves contacting the deactivated catalyst with a first gaseous mixture consisting essentially of from $O_2$, $H_2O$, halogen or a halogen-containing compound, and an inert gas (such as nitrogen, helium or $CO_2$), at 375-500° C. This is followed by contacting the catalyst with a second gaseous stream comprising $O_2$, water, a halogen-containing compound, and an inert gas. Subsequently, the oxygen and water in contact with the catalyst are purged using an inert gas. Finally, the catalyst is treated with substantially water-free hydrogen steam at a temperature of from 400 to 600° C. to obtain the regenerated catalyst.

Apart from the above patent documents, methods for regenerating alumina supported polyatomic catalysts Pt—Sn/$Al_2O_3$, PtReSn/$Al_2O_3$ and PtReGe/$Al_2O_3$ by treatment with oxygen and ozone have been disclosed by Pieck et al and D'Ippolito et al in Applied Catalysis A: General 278 (2005) 173-180 and *Applied Catalysis A: General* 388 (2010) 272-277 respectively.

OBJECTS

Some of the objects of the present disclosure are described herein below:

It is an object of the present disclosure to ameliorate one or more problems of the prior art or to at least provide a useful alternative.

It is another object of the present invention to provide a method for regeneration of a polyatomic catalyst used in the conversion of paraffin to olefin wherein the stability of the regenerated catalyst is better than 90% and its productivity is at par with the productivity of a fresh catalyst.

It is an object of the present invention to provide a method for regeneration of a polyatomic catalyst used in the conversion of paraffin to olefin that improves the selectivity of the catalyst.

It is another object of present invention to provide an effective way of regenerating core-shell catalyst particles in mild environment to avoid the peeling and abrasion of delicate particles.

It is another object of the present invention to provide an environment friendly method for regeneration of a polyatomic catalyst used in the conversion of paraffin to olefin that obviates the need for Platinum metal recovery for each batch thereby avoiding the usage of corrosive acids and the generation of alumina sludge.

It is still another object of the present invention to provide a method for method for regeneration of a polyatomic catalyst used in the conversion of paraffin to olefin that is economical and which allows one time saving against available spent catalyst inventory.

Other objects and advantages of the present invention will be more apparent from the following description.

DEFINITIONS

As used in the present specification, the following words and phrases are generally intended to have the meanings as set forth below, except to the extent that the context in which they are used to indicate otherwise.

The term "fresh catalyst" means an active catalyst not used for any application.

The term "spent catalyst" means a deactivated catalyst discharged from reactor.

The term "regenerated catalyst" means deactivated catalyst processed to regain its activity for desired application The term "Activity" is used for the Bromine Number (weight percent of olefins in reaction product).

The term "Stability" is used for percent activity left at the end of 5th hour, i.e. ratio of fifth hour bromine number to first hour bromine number in terms of percentage.

The term "Selectivity" is used for the molar ratio of olefins conversion (mono+di olefin) to total conversion (mono+di olefin+aromatics) in weight percent.

BET surface area means total surface area contributed by catalyst, measured by Nitrogen Physisorption method using BET equation Crushing strength means strength applied resulting in crumbling of particle Attrition loss means the abrasion loss of catalyst measured by tumbling of material under test conditions.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

SUMMARY

In accordance with the present disclosure there is provided a method for regenerating a spent dehydrogenation catalyst discharged from the reactor set up for conversion of n-paraffin to olefin in the presence of a dehydrogenation catalyst to obtain a regenerated catalyst; said method comprising the following steps:

removing coke deposited on the spent catalyst at least partially by treating it with an ozone-oxygen stream at temperatures lower than 110° C. in a programmed manner to obtain a catalyst with residual coke deposited thereon;

de-coking the catalyst with residual coke deposited thereon by oxidizing it with an oxygen stream at temperature ranging between 380° C. and 480° C.;

stabilizing the de-coked catalyst by contacting it with a nitrogen stream;

rejuvenating the stabilized de-coked catalyst by re-distribution of its catalytically active sites by contacting it with an air-nitrogen gas stream containing a halogenated hydrocarbon at about 480° C.; and reducing at least one metal oxide in the rejuvenated catalyst to metals by passing hydrogen-nitrogen stream.

Typically, the pressure of the ozone-oxygen stream in the method step of partially removing the coke deposited on the spent catalyst ranges between 100 kPa and 400 kPa.

Typically, the partial pressure of ozone in the ozone-oxygen stream ranges between 5 and 8 kPa.

Typically, the pressure of the oxygen stream in the method step of de-coking ranges between 100 kPa and 400 kPa.

Typically, the pressure of the air-nitrogen gas stream containing a halogenated hydrocarbon ranges between 100 kPa and 400 kPa.

Typically, the partial pressures of air and halogenated hydrocarbon in the air-nitrogen gas stream containing a halogenated hydrocarbon range between 0.6 to 0.8 kPa and 4.5 to 5 kPa respectively.

Typically, the halogenated hydrocarbon is at least one selected from the group consisting of chloroform, ethylene dichloride and carbon tetra chloride.

In accordance with one embodiment of the present disclosure, the method further comprises stabilizing rejuvenated catalyst by contacting it with an air-nitrogen stream before reduction of metal oxides to metals.

Typically, the dehydrogenation catalyst is a fresh catalyst.

Alternatively, the dehydrogenation catalyst is a previously regenerated catalyst.

Typically, the dehydrogenation catalyst is a layered alumina catalyst consisting of:

at least one form of alumina selected from the group consisting of gamma alumina, delta alumina and theta alumina in the outer shell;

inert alumina or aluminosilicate as core and optionally, a binder.

Typically, the dehydrogenation catalyst comprises:

at least one VIIIB group metal selected from the group consisting of platinum, iridium, osmium, ruthenium, palladium and rhodium;

at least one group IVA group metal selected from the group consisting of gallium, tin, lead; and at least one alkali/alkaline earth metal selected from the group consisting of Lithium, Sodium and Magnesium.

Typically, the particle size of the VIIB group metal particles in the fresh catalyst, spent catalyst and the regenerated dehydrogenation catalyst ranges between 0.4 and 2 nm.

Typically, the range of BET surface area of the dehydrogenation catalyst is maintained during the regeneration method and it ranges between 30 to 60 $m^2/gm$ for both the fresh as well as the regenerated catalyst.

Typically, particle crushing strength and attrition loss characteristics of the dehydrogenation catalyst are maintained during the regeneration method and the respective ranges for these characteristics range between 1 to 6 Kg and 0.05 to 0.15% for both the fresh as well as the regenerated dehydrogenation catalyst.

Typically, the selectivity of the regenerated dehydrogenation catalyst is at least at par or better than the selectivity of the fresh catalyst.

Typically, the regenerated dehydrogenation catalyst offers at least 90% stability as compared to fresh catalyst assuring same level of activity and selectivity like fresh catalyst.

Typically, the regenerated dehydrogenation catalyst is capable of being used at least once for the conversion of n-paraffin to olefin in a commercial reactor.

DESCRIPTION

In accordance with the present invention there is provided a method for regenerating a spent deactivated dehydrogenation catalyst that is used for the conversion of $C_{10}$ to $C_{14}$ range paraffin to produce mono olefin.

Various catalysts used for dehydrogenation of n-paraffin are known. These catalysts either comprise a single porous gamma alumina unisphere as a support or they may comprise layered alumina supports comprising inert alfa alumina or alumina silicate as core and gamma or delta or theta alumina as shell. The other constituents of such catalysts include a Group VIIIB component such as platinum, iridium, osmium, ruthenium, palladium and rhodium along with a Group IVA component which includes gallium, tin, lead that are dispersed uniformly either on the shell or through out the support structure in varying amounts. The particle size of the catalytically active Group VIIIB metal particles often varies between 0.4 to 2.0 nm. Further, these catalysts also comprise a promoter from IA and/or IIA group which include sodium, lithium and potassium. Depending upon the configuration and composition of the catalyst, the metal-metal interactions between components or support vary in each case. The metal components may or may not have interaction with alumina support in association with halide component. The alumina support has controlled mesoporous distribution for efficient diffusion of molecules.

The dehydrogenation reaction is highly endothermic. It is carried out above 460° C. Along with olefin it also produces light end gases, heavy alkylate and aromatics. The latter get deposited on the catalyst support and get polymerized to form coke. As a result the catalyst activity goes down gradually due to build-up of coke. Temperature is raised gradually during the process to compensate the loss in activity of the catalyst composition due to coke deposition.

Over a period of time, the catalyst is discharged once it fails to maintain the desired productivity and selectivity. Such discharged catalyst is called as a spent catalyst. Other factors that lead to deterioration of the catalyst include poisoning or crumbling/dusting of catalyst bed.

In accordance with the present invention there is provided a method for regenerating spent dehydrogenation catalyst. The regeneration process of the present invention starts with the removal of coke deposited on the catalyst surface. Accordingly, the major portion of the coke deposited on the dehydrogenation catalyst of the type described herein above is removed by treating a bed of the spent dehydrogenation catalyst with a stream comprising ozone and oxygen stream at temperature below 110° C. in a programmed manner. The pressure of the ozone-oxygen stream is maintained between 100 kPa and 400 kPa. The partial pressure of ozone in the ozone-oxygen stream ranges between 5 and 8 kPa.

This is followed by the method step of oxidizing the trace amount of residual coke on the catalyst surface by treating it with an oxygen stream at temperature in the range of about 380-480° C. The pressure of the oxygen stream in this method step is typically maintained between 100 and 400 kPa.

The de-coked catalyst thus obtained from the above step is stabilized by passing a nitrogen stream over the catalyst bed. The stabilized catalyst is then rejuvenated by re-distribution of the active sites by contacting the catalyst bed with an air-nitrogen gas stream along with a halogenated hydrocarbon at about 480° C.

The halogenated hydrocarbon used in accordance with the process of the present invention typically comprise chloroform, carbon tetrachloride and ethylene dichloride In accordance with one of the embodiments of the present invention chloroform is used along with air-nitrogen gas stream for re-distributing the active sites in the catalyst. The pressure of the air-nitrogen gas stream containing a halogenated hydrocarbon ranges is kept between 100 kPa and 400 kPa. The partial pressures of air, halogenated hydrocarbon in the air-nitrogen gas stream containing a halogenated hydrocarbon are typically maintained between 0.6 to 0.8 kPa and 4.5 to 5 kPa respectively.

In accordance with one of the embodiments of the present invention, the catalyst with re-distributed active sites is stabilized again by passing an air-nitrogen stream over the catalyst bed.

The catalyst with re-distributed active sites is subjected to a reduction reaction by contacting it with a mixture of hydrogen and nitrogen to obtain a regenerated catalyst with 90% stability with respect to the stability of the fresh catalyst.

Unlike the processes reported in the prior art, the regenerating method of the spent dehydrogenation catalyst in accordance with the present invention does not affect the BET surface area of the spent (as well as fresh) catalyst adversely. As a result, the BET surface area for both the spent (fresh) as well as the regenerated catalyst remains the same and it varies between 30 to 60 m$^2$/gm. Further, the active metal dispersion of catalyst remains intact in 62% to 68%. Further, the regenerating method of the present invention also helps to retain the crucial properties of the catalyst which include crushing strength and attrition loss. The crushing strength and attrition loss for both the spent (as well as fresh) as well as the regenerated dehydrogenation catalyst range between 1 to 6 Kg and 0.05 to 0.15%. These properties determine the stability as well as productivity of the catalyst.

Another advantage of the regenerating method of the present invention is that the selectivity of regenerated catalyst obtained by the method of the present invention is better than or at least at par with the selectivity of the fresh catalyst.

The regenerated dehydrogenation catalyst obtained by the method of the present invention is capable of being used at least once for the conversion of n-paraffin to olefin in a commercial reactor.

EXAMPLES

Out of different method steps, as mentioned below—

Removal of major portion of coke residing mostly on alumina support by burning at ambient conditions using ozone. Removal of residual portion of coke mostly present on active metal sites by heating at elevated temperature in presence of oxygen.

Removal of major portion of coke by heating at 380° C. followed by heating at 480° C. in presence of air Nitrogen mixture. This is followed by redispersion of active metal by air nitrogen mixture carrying vapours of chloroform. This is followed by purging with air nitrogen stream.

Reduction of catalyst by hydrogen gas.

First 2 stages were carried out in 25.4 mm diameter stainless steel reactor system with necessary flow, pressure & temperature controls. Total 5 gms spent catalyst was charged in the middle zone of the reactor which was placed in tubular furnace with PID controller. In step (a), the Ozone gas was generated by passing pure oxygen gas through ozonator with the flow rate of 500 ml/min, obtaining the ozone partial pressure of 7 kPa. This stream was passed through catalyst bed at 30° C. (ambient) temperature. The peak in bed temperature was attained in 105° C. to 120° C. range in just 6 to 10 minute duration. The temperature gradually goes down and to 50° C. to 60° C. temperatures after 45 minutes. The catalyst bed was unsettled after 1 hour and the ozonation was continued further for 1 more hour in same condition. The bed temperature was increased to 120°

C. temperature. The bed was unsettled after 2 hours & the ozonation was continued further for 2 more hours. The ozonator was switched off and the bed temperature was ramped up with 2° C./min. rate till 380° C. and maintained for 0.5 hours. Temperature was ramped further till 480° C. temperature and maintained for next 2 hours. In step (b), the heating was carried out by using air nitrogen mixture (5:95 proportions). The bed was heated till 380° C. temperature with ramp rate of 2° C./min and then soaked for 2 hours. Further heating was carried out till 480° C. temperature and maintained for 2 hours. The temperature was brought down to 450° C. and then Liquid chloroform was introduced in the stream with flow rate of 0.05 ml/min. The stream was preheated at 100° C. temperature and passed through the catalyst bed for 1 hour. Chloroform dosing was discontinued and the bed was purged further for 2 hour with nitrogen air mixture. Bed was cooled and the catalyst was discharged. In step (c), this regenerated or rejuvenated catalyst was charged in another reactor of similar dimension for reduction step. High purity Hydrogen was passed at atmospheric pressure with flow rate of 380 ml/min. The bed was heated with ramp rate of 3° C./min. till 150° C. temperature, soaked for 1 hour and then heated further to 480° C. with same ramp rate and soaked for 2 hrs. This catalyst was completely ready for reuse and was tested further in the same reactor for evaluating performance parameters like activity and selectivity.

The fresh catalyst employed in accordance with this invention is necessarily constituted of alumina or layered alumina support. Alumina phase can be gamma, delta, theta or mixtures thereof. In case of layered catalyst the core can be alumina or aluminosilicate. Two types of catalyst were considered, Type-I had aluminosilicate core and gamma alumina phase as layer whereas Type-II had α-alumina core and mixture of gamma and predominantly Delta and Theta alumina phases as layer. The catalyst had surface area more than 30 m$^2$/gm preferably 40 to 60 m$^2$/gm, bulk density 0.3 to 0.9 gm/ml preferably 0.7 to 0.8 gm/ml, total pore volume 0.2 to 1.1 ml/gm, preferably 0.2 to 0.6 ml/gmc and an average pore diameter in 50 to 200 Å range. Catalyst particles are 1 to 4 mm in size, preferably 1 to 2.5 mm. The particle strength varies from 0.5 kg to 6 Kg and attrition loss from 0.02% to 0.2%. Metals from group VIIIB added primarily to carry out the dehydrogenation activity whereas the metals from IVA are added to control the dehydrogenation activity and thus responsible in minimizing the coke formation. Preferably the metals employed herein are Platinum and Tin respectively. Alkali metals form IA group, preferably Sodium and Lithium are also added to control the acidic function of alumina. For all above metals, the concentration varies from 0.1 to 0.7%, preferably 0.15% to 0.3%.

Catalyst discharged from industrial reactor has dust containing few crumbled catalyst particles and fine powder, around 0.1% by weight. The dust was removed by sieving the material through 1 mm sieve and the catalyst was taken up for regeneration. Type-1 had carbon deposit in the range of 3% to 5% by weight whereas Type-2 had 1 to 3% by weight. With exception of carbon, no other elemental contamination was noticed after analysing spent catalyst. Compared to fresh catalyst, no significant change in physical, mechanical or structural properties was observed in deactivated catalyst.

The regenerated catalyst with 1.0 ml bed volume was evaluated in the same reactor system after completion of reduction stage as mentioned earlier. The catalyst bed temperature was maintained at 470° C. temperature with hydrogen flow rate of 380 ml/min. Normal Decane liquid was injected with flow rate of 30 ml/Hr in preheater set at 280° C. temperature and the vapours were carried with hydrogen gas to catalyst bed. The reaction is endothermic in nature. To maintain the bed temperature constant at 470° C. the furnace output was increased intermittently. The bed effluent was condensed and collected. The reaction was continued isothermally till 5 hours. The liquid was collected in gas liquid separator at the end of every hour and was tested for bromine number measurement to observe the initial activity of catalyst and rate of drop in activity for 5 hours in succession. The LHSV (liquid hourly space velocity) was 26 Hr-1 and Hydrogen/hydrocarbon ratio ($H_2$/HC ration) was 6.0 and reactor was at atmospheric pressure. In another set of experiments, the catalyst was evaluated at more severe conditions (Example 6); dodaceane was used in place of decane. The reaction temperature was maintained at 490° C. and $H_2$/HC ratio was maintained at 2.0 and the reactor pressure was 1.35 bars. The collected liquid was tested by using HPLC technique for mono olefin, di olefin & aromatics content. Accordingly the hourly drop in activity (mono+ diolefins) and selectivity was measured.

Proportion of first hour bromine number of regenerated catalyst to that of fresh catalyst is termed as initial activity in terms of percentage. Proportion of 5th hour Bromine number to that of first hour bromine number is termed as stability in terms of percentage in following examples.

To understand and optimize the regeneration process, experiments were also carried out using direct oxidation and by conventional way of using diluted air stream. Following examples would explain the way by which the proposed regeneration scheme was arrived at.

The invention will now be described with the help of following non-limiting examples:

Conventional Example 1

Activity of spent catalyst was measured along with the activity of decoked catalyst in air for comparison. To remove volatiles, 10 gm spent catalyst was charged in reactor and heated at 120° C. for 2 hours with flow rate of 500 ml/min. Then the temperature was heated with ramp rate of 3° C./min. till 380° C. temperature and soaked for 2 hours. The temperature was raised to 480° C. with 2° C./min ramp rate and soaked for 4 hours. The fresh and spent catalysts were tested with decoked catalysts for bromine number evaluation to know the activity of catalyst. The drop in activity is recorded in terms of bromine number in Table 1.

TABLE 1

| Catalyst | Fresh | Spent | Decoked |
| --- | --- | --- | --- |
| Type-I | 23.7 | 8.2 | 13.8 |
| Type-II | 21.7 | 7.7 | 6.4 |

Type I—aluminasilicate core and gamma alumina phase as layer

Type II—alpha-alumina core and mixture of gamma and predominantly Delta and Theta alumina phases as layer The results show that the residual activity in spent stage both for Type-I & Type-II catalyst was 35%. After decoking the spent catalyst in air, Type-I catalyst activity improved to 58%. In case of Type-II catalyst it went down further to 29%.

Conventional Example 2

Regeneration was tried by using diluted air mixture in conventional way. The reactor was charged with 5 gms of spent catalyst. The material was heated using air & nitrogen mixture with 5:95 proportion. Flow rate of gas was 500 ml/min. To remove volatiles, spent catalyst was heated at 120° C. for 2 hours. Temperature was increased with the ramp rate of 3° C./min. till 380° C. temperature and soaked for 4 hours. The temperature was raised to 480° C. with 2° C./min ramp rate and soaked for 4 hours. The fresh and regenerated catalysts, both CAT-A (Regenerated Type-I) and CAT-B (Regenerated Type-II) were tested for bromine number evaluation for 5 hours to know the activity and stability of catalyst. The drop in activity is recorded in terms of bromine number in Table 2.

TABLE 2

| Hour | Type-I Fresh | Type-I Regenerated (CAT-A) | Type-II Fresh | Type-II Regenerated (CAT-B) |
|---|---|---|---|---|
| 1 | 23.7 | 20.2 | 21.7 | 19.9 |
| 2 | 22.1 | 17.0 | 19.6 | 16.5 |
| 3 | 21.1 | 14.5 | 18.3 | 14.8 |
| 4 | 20.3 | 13.1 | 16.8 | 12.2 |
| 5 | 19.4 | 13.6 | 14.7 | 11.0 |

The results shows that, as compared to corresponding fresh catalyst, CAT-A has initial activity 85% and CAT-B has initial activity 92%. CAT-A shows stability of 67% as compared to stability of 82% for fresh catalyst (Type-I). CAT-B shows stability of 55% as compared to stability of 68% for fresh catalyst (Type-II).

Conventional Example 3

Regeneration was tried by using diluted air mixture followed by rejuvenation. 5 gms of spent catalyst of Type-I was charged in reactor and the material was heated using air & nitrogen mixture with 5:95 proportion. Flow rate of gas was 500 ml/min. To remove volatiles, spent catalyst was heated at 120° C. for 2 hours. Then the bed was heated with ramp rate of 3° C./min. till 380° C. temperature and soaked for 2 hours. The temperature was raised to 480° C. with 2 C/min ramp rate and soaked for 4 hours. Chloroform was dosed with flow rate of 0.05 ml/min and vaporized at 100° C. temperature. The vapours were passed through catalyst bed along with air-nitrogen stream for 1 hour. Regenerated and rejuvenated catalysts were tested for bromine number evaluation for 5 hours to know the activity and stability of catalyst. The drop in activity is recorded in terms of bromine number in Table 3.

TABLE 3

| Hour | Type-I Fresh | CAT-C Rejuvenated |
|---|---|---|
| 1 | 23.7 | 22.1 |
| 2 | 22.1 | 19.7 |
| 3 | 21.1 | 18.2 |
| 4 | 20.3 | 17.2 |
| 5 | 19.4 | 16.4 |

The results shows that, as compared to corresponding fresh catalyst, CAT-C has initial activity 93%. CAT-C shows stability of 74% as compared to stability of 82% for fresh catalyst (Type-I).

Working Example 4

Regeneration was carried out by using diluted ozone gas mixture. 5 gms of spent catalyst was charged in reactor and the reaction was started using ozone & oxygen mixture with 8:92 proportion at ambient temperature with flow rate of gas was 500 ml/min for 2 hour. Bed temperature reached 80 to 90° C. for Type-I catalyst and 105 to 120° C. for Type-II catalyst temperature on account of coke oxidation and came back to 50° C. during this period. Bed temperature was increased to 120° C. and maintained for 9 hours. The regenerated catalysts were tested for activity and stability for 5 hours. The drop in activity is recorded in terms of bromine number in Table 4.

TABLE 4

| Hour | Type-I Fresh | CAT-D Regenerated | Type-II Fresh | CAT-E Regenerated |
|---|---|---|---|---|
| 1 | 23.7 | 19.7 | 21.7 | 14.8 |
| 2 | 22.1 | 17.2 | 19.6 | 12.8 |
| 3 | 21.1 | 16.1 | 18.3 | 11.6 |
| 4 | 20.3 | 14.4 | 16.8 | 10.4 |
| 5 | 19.4 | 13.6 | 14.7 | 10.0 |

The results shows that, as compared to corresponding fresh catalyst, CAT-D has initial activity 83% and CAT-E has initial activity 68%. CAT-D shows stability of 69% as compared to stability of 82% for fresh catalyst (Type-I). CAT-E shows stability of 68% which is similar to stability of 68% for fresh catalyst (Type-II).

Working Example 5

Regeneration was tried by using diluted ozone gas mixture similar to example 4. After soaking at 110° C. temperatures, the temperature was raised with ramp rate of 3° C./min till 380° C. and soaked for 0.5 Hr. Temperature was raised to 480° C. and soaked for 2 hours. The fresh and regenerated catalysts were tested for 5 hours to observe the activity and stability of catalyst. The drop in activity is recorded in terms of bromine number in Table 5.

TABLE 5

| Hour | Type-I Fresh | CAT-F Regenerated | Type-II Fresh | CAT-G Regenerated |
|---|---|---|---|---|
| 1 | 23.7 | 22.7 | 21.7 | 22.6 |
| 2 | 22.1 | 22.0 | 19.6 | 19.7 |
| 3 | 21.1 | 19.5 | 18.3 | 18.4 |
| 4 | 20.3 | 17.9 | 16.8 | 16.9 |
| 5 | 19.4 | 16.9 | 14.7 | 16.0 |

The results shows that, as compared to corresponding fresh catalyst, CAT-F has initial activity 96% and CAT-G has initial activity 104%. CAT-F shows stability of 75% as compared to stability of 82% for fresh catalyst (Type-I). CAT-G shows stability of 71% which is similar to stability of 68% for fresh catalyst (Type-II).

Comparative Example 6

Regenerated samples of Catalyst Type-I, prepared by example 3, 4 and 5 were evaluated in laboratory reactors for severe test conditions. Product liquid samples were collected hourly for seven hours. In addition to bromine measurement for activity, the product liquid composition was also tested for mono & di olefins & aromatics by using HPLC method. The bromine number results are mentioned in Table 6.

TABLE 6

| Hours | Type-I Fresh | Rejuvenated in air CAT C | O3 Regn. CAT D | O3 followed by 480 C. temp. CAT F |
|---|---|---|---|---|
| 1 | 31.1 | 29.0 | 26.9 | 31.1 |
| 2 | 29.5 | 25.9 | 25.3 | 28.5 |
| 3 | 28.1 | 23.9 | 22.7 | 26.7 |
| 4 | 27.0 | 22.3 | 21.3 | 24.8 |
| 5 | 25.8 | 20.3 | 19.6 | 23.3 |

The results show that as compared to fresh catalyst, under severe conditions, the initial activity of CAT C, CAT D and CAT F is 93%, 86% and 100% respectively. The stability results at normal reaction conditions and severe reaction conditions are compared in Table 7.

TABLE 7

| Hours | Type-I Fresh | Rejuvenated in air CAT C | O3 Regn. CAT D | O3 followed by 480 C. temp. CAT F |
|---|---|---|---|---|
| 5 Hr Normal conditions | 82 | 74 | 69 | 75 |
| 5 Hr Severe conditions | 83 | 70 | 73 | 75 |

The results show that even at severe operating conditions, ozone treated regeneration shows equally good stability. For rejuvenated catalyst some drop at severe operating conditions.

Combined mono & di olefin selectivity for CAT C, CAT D and CAT F at severe run conditions is shown in Table 8.

TABLE 8

| Hours | Fresh Catalyst A | Rejuvenated in air CAT C | O3 Regn. CAT D | O3 followed by 480 C. temp. CAT F |
|---|---|---|---|---|
| 1 | 79.0 | 83.0 | 89.0 | 83.2 |
| 2 | 80.2 | 84.3 | 89.7 | 83.5 |
| 3 | 80.6 | 84.5 | 88.3 | 85.2 |
| 4 | 81.2 | 85.2 | 90.6 | 85.2 |
| 5 | 81.7 | 85.2 | 90.8 | 85.9 |

The results show that, as compared to fresh catalyst, after rejuvenation or regeneration process leads to significant improvement in selectivity towards olefin. Low temperature ozone regeneration shows substantial improvement in selectivity which drops marginally after oxidation at higher temperature.

In addition to activity, selectivity and stability study, the regenerated catalyst was evaluated with fresh catalyst for comparison of pore size distribution, crystalline phase of alumina support. The particles were tested for mechanical properties. Active metal distribution was evaluated by hydrogen titration, The nano particle size and distribution was evaluated by HRTEM.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The invention claimed is:

1. A method for regenerating a spent mesoporous dehydrogenation catalyst discharged from a reactor set up for conversion of n-paraffin to olefin; said method comprising the following steps:
    removing coke deposited on the spent catalyst at least partially by treating it with an ozone-oxygen stream at temperatures lower than 110° C. and at a partial pressure of ozone in the ozone-oxygen stream ranging between 5 kPa and 8 kPa in a programmed manner to obtain a catalyst with residual coke deposited thereon;
    de-coking the catalyst with residual coke deposited thereon by oxidizing it with an oxygen stream at temperature ranging between 380° C. and 480° C.;
    stabilizing the de-coked catalyst by contacting it with a nitrogen stream;
    rejuvenating the stabilized de-coked catalyst by re-distribution of its catalytically active sites by contacting it with an air-nitrogen gas stream containing a halogenated hydrocarbon at about 150 to about 480° C.; and
    reducing at least one metal oxide in the rejuvenated catalyst to metals by passing hydrogen-nitrogen stream,
    wherein the dehydrogenation catalyst is a layered alumina catalyst consisting of:
        at least one form of alumina selected from the group consisting of gamma alumina, delta alumina and theta alumina in the outer shell;
        inert alumina or aluminosilicate as core;
        at least one VIIIB group metal selected from the group consisting of platinum, iridium, osmium, ruthenium, palladium and rhodium in the amount from 0.15 to 0.3%;
        at least one IVA group metal selected from the group consisting of gallium, tin, and lead; and
        at least one alkali/alkaline earth metal selected from the group consisting of Lithium, Sodium and Magnesium.

2. The method as claimed in claim 1, wherein the pressure of the ozone-oxygen stream in the method step of partially removing the coke deposited on the spent catalyst is maintained between 100 kPa and 400 kPa.

3. The method as claimed claim 1, wherein the pressure of the oxygen stream in the method step of de-coking is maintained between 100 kPa and 400 kPa.

4. The method as claimed claim 1, wherein the pressure of the air-nitrogen gas stream containing a halogenated hydrocarbon is between 100 kPa and 400 kPa.

5. The method as claimed in claim 1, wherein the partial pressures of air and halogenated hydrocarbon in the air-nitrogen gas stream containing a halogenated hydrocarbon maintained between 0.6 kPa to 0.8 kPa and 4.5 kPa to 5 kPa respectively.

6. The method as claimed in claim 1, wherein the halogenated hydrocarbon is at least one selected from the group consisting of chloroform, ethylene dichloride and carbon tetra chloride.

7. The method as claimed in claim 1, further comprising the method of stabilizing rejuvenated catalyst by contacting it with an air-nitrogen stream before reduction of metal oxides to metals.

8. The method as claimed in claim 1, wherein the dehydrogenation catalyst is a layered alumina catalyst further comprising a binder.

9. The method as claimed in claim 1, wherein the particle size of the VIIIB group metal particles in the fresh catalyst, spent catalyst and the regenerated dehydrogenation catalyst ranges between 0.4 and 2 nm.

10. The method as claimed in claim 1, wherein the range of BET surface area of the dehydrogenation catalyst is maintained during the regeneration method and it ranges between 30 to 60 $m^2/gm$ for both the fresh as well as the regenerated catalyst.

11. The method as claimed in claim 1, wherein particle crushing strength and attrition loss characteristics of the dehydrogenation catalyst are maintained during the regeneration method and the respective ranges for these characteristics range between 1 to 6 Kg and 0.05 to 0.15% for both the fresh as well as the regenerated dehydrogenation catalyst.

12. The method as claimed in claim 1, wherein the regenerated dehydrogenation catalyst is capable of being used at least once for the conversion of n-paraffin to olefin in a commercial reactor.

* * * * *